United States Patent [19]

Masuda et al.

[11] Patent Number: 4,557,654
[45] Date of Patent: Dec. 10, 1985

[54] COVER OF A NUT IN ENGAGEMENT WITH A BOLT

[75] Inventors: Makoto Masuda, Chigasaki; Hiroshi Iwasita, Misato; Toshihiko Kuwabara, Itami, all of Japan

[73] Assignee: Fuji Seimitsu Mfg. Co., Ltd., Toyonaka, Japan

[21] Appl. No.: 638,542

[22] Filed: Aug. 7, 1984

Related U.S. Application Data

[63] Continuation of Ser. No. 351,345, Feb. 23, 1982, abandoned, which is a continuation of Ser. No. 125,710, Feb. 28, 1980, abandoned.

[30] Foreign Application Priority Data

Sep. 10, 1979 [JP] Japan .......................... 54-124938[U]

[51] Int. Cl.[4] ............................................ F16B 37/14
[52] U.S. Cl. .................................. 411/431; 411/373; 411/907
[58] Field of Search ................. 411/429–431, 411/371–373, 902, 903, 907, 908

[56] References Cited

U.S. PATENT DOCUMENTS

| | | |
|---|---|---|
| 1,254,514 | 1/1918 | Lehmann ............................ 411/429 |
| 2,227,250 | 12/1940 | Dirrig ................................... 411/431 |
| 2,462,023 | 2/1949 | Johanson et al. ...................... 403/24 |
| 2,726,009 | 12/1955 | Murdock, Sr. et al. ............ 411/429 |
| 2,786,359 | 3/1957 | Karlan et al. ........................ 411/428 |
| 2,795,144 | 6/1957 | Morse ................................. 411/902 |
| 3,431,811 | 3/1969 | Yonkers ............................... 411/432 |
| 3,471,158 | 10/1969 | Solins ................................. 411/431 |
| 3,548,704 | 12/1970 | Kutryk ................................. 411/373 |
| 4,018,133 | 4/1977 | Chaivre et al. ...................... 411/429 |
| 4,143,578 | 3/1979 | Becker ................................. 411/430 |

FOREIGN PATENT DOCUMENTS

| | | |
|---|---|---|
| 1843053 | 7/1961 | Fed. Rep. of Germany . |
| 1943183 | 7/1966 | Fed. Rep. of Germany . |
| 1943053 | 10/1967 | Fed. Rep. of Germany . |
| 1263923 | 5/1961 | France ................................. 411/431 |
| 110259 | 8/1977 | Japan . |
| 75673 | 6/1978 | Japan . |
| 521297 | 5/1940 | United Kingdom . |
| 810394 | 3/1959 | United Kingdom . |
| 993021 | 5/1965 | United Kingdom . |

Primary Examiner—Kenneth J. Dorner
Assistant Examiner—Neill Wilson
Attorney, Agent, or Firm—Wegner & Bretschneider

[57] ABSTRACT

A cover of a nut according to the present invention is constituted of a resilient body, having a cavity shaped so as to be prevented from turning by an operating means formed on the nut for convenience of turning the nut adapted to be engaged with the bolt and being equipped with a tubiform basal portion receiving the periphery of the nut engaged with the bolt to be fitted within said cavity and a hollow swelled portion extending integrally from one of the ends of said basal portion and closed at an end located far from the basal portion. Said resilient body is provided with a disengagement-proof means preventing the cover applied over the nut from slipping out of the nut after displacing in the direction of the axis of the nut.

3 Claims, 8 Drawing Figures

COVER OF A NUT IN ENGAGEMENT WITH A BOLT

This application is a continuation of application Ser. No. 351,345, filed Feb. 23, 1982, now abandoned, which in turn is a continuation of application Ser. No. 125,710, filed Feb. 28, 1980, and now abandoned.

The present invention relates to a cover to be applied to a nut in engagement with a bolt.

BACKGROUND OF THE INVENTION

In connecting by bolt and nut, a fastened piece is generally bound by a nut in a state of the bolt with an end of the axis a little beyond the upper end of the nut. And the engaged portion between the bolt and nut, being left intact, is inrusted with rust after being exposed to the weather, especially when used outdoors, with result of difficulty in disengagement. For this reason, fastened piece is conventionally adapted to be removed after disengaging the nut from the bolt by means of gas cutting or the like. Consequently, when a bolt is impossible or troublesome to be exchanged, for example, as in a case of stud bolt, a serious influence is given. In case that a bolt and nut are used in a corrosive atmosphere, if the engaged portion is corroded, the proper function of fastening becomes unable to be accomplished.

Even if a fastening portion between the bolt and nut, or a screwed portion is not rusted, in case of a lock nut of all metal adapted to have a plate spring member for locking at an end of the nut and to be shaped to interfere with the screw thread of the bolt by means of said plate spring member, screwing a lock nut onto a bolt causes said plate spring member to be positioned on the side of the free end of the bolt far from the fastened piece, resulting in the plate spring member exposed to the weather or corrosive gases, and the plate spring member is often corroded at first to give rise to failure in function of preventing loosening.

SUMMARY OF THE INVENTION

It is an object of the present invention to provide a cover of a nut adapted to protect an engaging portion of a bolt and nut from being inrusted with rust or corroded as a result of being exposed to the weather or corrosive gases.

It is another object of the present invention to protect a plate spring from being corroded owing to exposure to the weather or corrosive gases and to protect function of making not to be loosened from decreasing owing to corrosion, in case that a lock nut provided with a plate spring for interfering with the bolt.

It is a further object of the present invention to provide a cover of a nut equipped with a disengagement-proof means, which is adapted to prevent the cover from being removed from the nut after being fitted to the nut.

It is a still further object of the present invention to provide a cover of a nut for which safety considerations are paid in protecting the personel from being injured by an end of a bolt by covering an end of a bolt projecting out of a nut.

According to the present invention a cover of a nut in engagement with a bolt constituted of a resilient body, having a cavity shaped in such a way as to be prevented from turning by means of an operating means formed on the nut for convenience of turning the nut adapted to be engaged with the bolt and being equipped with a tubiform basal portion receiving the periphery of the nut engaged with the bolt to be fitted within said cavity and a hollow swelled portion extending integrally from one of the ends of said basal portion and closed at an end located far from the basal portion, wherein said resilient body is equipped with a disengagement-proof means preventing the cover applied over the nut from slipping out of the nut after displacing in the direction of the axis of the nut.

The cavity in the basal portion is most preferably adapted to have a shape to be fitted with the peripheral configuration of the nut, that is, a cross-sectional configuration at a plane perpendicular to the axis of the nut; corresponding to the hexagonal peripherial configuration of a nut, the cross-sectional configuration of the cavity is generally hexagonal, or may be twice, i.e. dodecagonal. Alternatively, for special purposes when a nut having a tetragonal or octagonal peripheral configuration is used, in such a case the cross-sectional configuration of the cavity is preferably tetragonal or octagonal respectively, or may be octagonal or hexadecagonal respectively. In these cases operating means formed on a nut for convenience of being turned by tools may be edges, hexagonal, tetragonal, or octagonal respectively, and planes located between said edges, or a pair of planes located face to face. That is to say, when a box spanner is used as a tool for turning the nut operating means for the nut becomes the former, and when a monkey spanner is used as a tool operating means becomes the latter. Accordingly the cavity formed as above-mentioned is provided with rotation-proof means engaged with said operating means. Further for a special purpose such a type of nut as the peripheral shape is circular and operating means formed on the nut for convenience of this nut by a tool are recesses, the cross-sectional shape of the cavity at the basal portion is circular and the tool is a handle having protrusions fitted with said recesses at each facing position of the recesses. In this case, consequently, the cavity is provided with a protrusion fitted with at least one of said recesses to be rotation-proof. What is important is that when the nut employed has edges the cavity is most preferably provided with an angular portion of the same number as these edges, then the cavity is tightly fitted with the periphery of the nut with perfect locking effect and without any clearance between the cavity and the periphery of the nut. However, when the cavity has angular portions, for instance, twice of the number of edges of the nut, flexibility for applying the cover over the nut increases with improved performance.

It is preferable that in applying the basal portion of a cover over the nut engaged with the bolt for the purpose of the basal portion exerting compressive force upon the nut the cavity of the basal portion is shaped to have an effective area smaller than the cross-sectional area of the nut and to be kept tightly on the periphery of the nut by the inner surface of the basal portion.

The length of the basal portion in the direction of the axis may extend all over the total length of the nut or may be determined to wrap only the end portion opposed to a portion facing to the fastened piece. In the case of the former, in order to prevent fluid from permeating between the face of the nut on the side of the fastened piece and the fastened piece, the end of the basal portion of the cover is shaped to be forced on the fastened piece by elasticity. And in the case of the latter, liquid is prevented from permeating by inserting a washer formed of rubber or plastics between the nut and the fastened piece.

Though the shape of the hollow swelled portion is generally cylindrical, it may be a frustum of a cone or of a pyramid. This swelled portion, which may be of any shape, is formed integrally with the basal portion and has a closed end located far from the basal portion for preventing rain and gasses from permeating inside.

In a preferred embodiment of the present invention, a screw thread is formed along the inner surface of the swelled portion and extrusions are formed inside the basal portion for engaging said screw thread with the screw thread of the bolt extending out of the nut and at the same time for fitting the extrusion of the basal portion with a groove formed on the periphery of the nut with a view to constructing disengagement-proof means with both of said elements, wherein the disengagement-proof means is not necessary to be composed of said both, but may be formed with either of them. That is to say, a disengagement-proof means can be made only by engaging screw thread formed on the swelled portion with screw thread of the bolt extruding out of the nut. On the other hand, instead of forming a screw thread on the swelled portion, disengagement-proof means can be made by fitting extrusions into a groove, the extrusions being formed on the basal portion and the groove being formed on the periphery of the nut.

Still further objects and characteristics of the present invention will be understood from the detailed descriptions referring following drawings.

Figure 1:
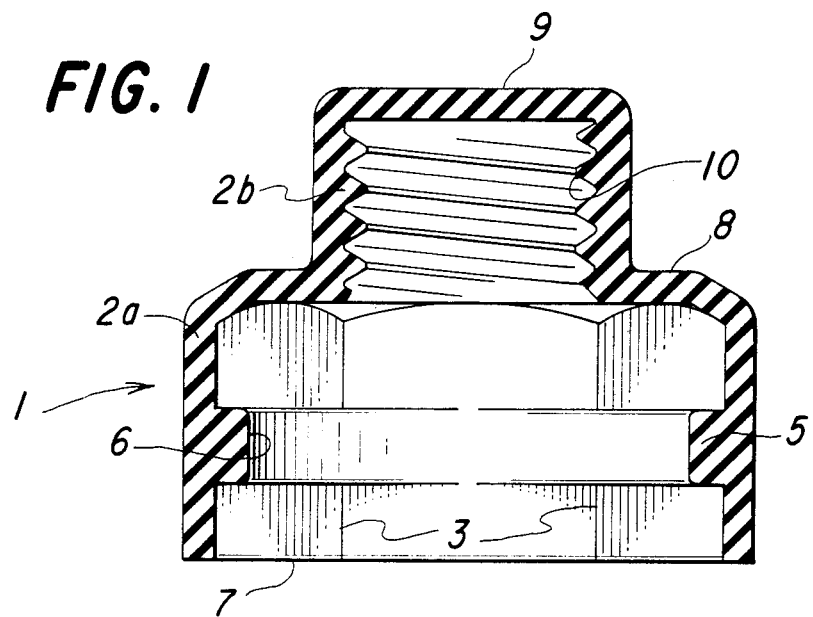
FIG. 1 is a cross-sectional drawing of a cover of a nut according to the present invention.
Figure 2:
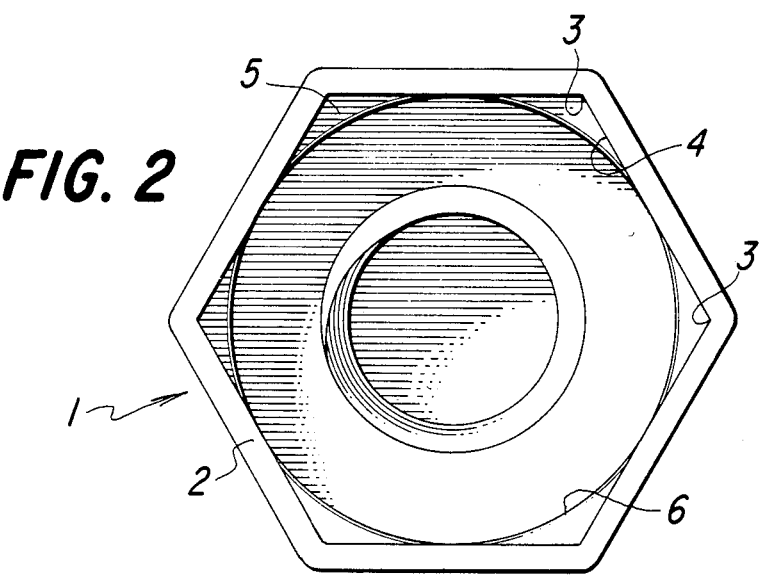
FIG. 2 is a plan of a cover shown in FIG. 1 viewed from the bottom.
Figure 3:
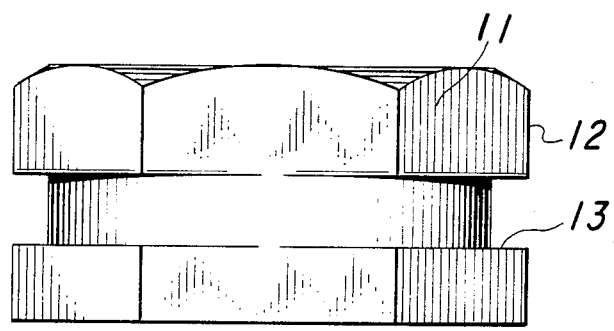
FIG. 3 is a front view of a nut.
Figure 4:
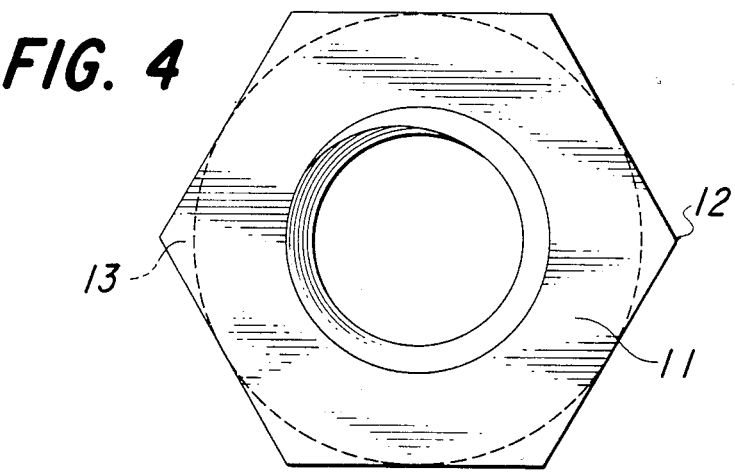
FIG. 4 is a plan of a nut shown in FIG. 3.

A cover 1 according to the present invention is, as shown in FIGS. 1 and 2, constituted of a water-proof resilient body, and has a tubiform basal portion 2a and a hollow swelled portion 2b extending from an end of said basal portion 2a. For said resilient body, soft synthetic resin or synthetic rubber can be used, such as polyvinyl chloride resin, polyethylene resin, polyurethane resin, fluoric resin, silicon rubber, and the like.

The basal portion 2a is provided with a multi-angular cavity 4 having edges 3 fitted with edges of a nut, and halfway of the multi-angular cavity 4 provided with extrusions 5 extending substantially perpendicular to a direction of extension of edges 3. In this embodiment, extrusion 5, as shown in FIG. 2, has maximum amount of extruding at the position of edges 3, and becomes zero at the middle of two edges 3, 3, resulting in configuration having a circular hole 6 in the plan.

In the opposite side of the basal portion 2a to an opening 7, said swelled portion 2b is integrally extended through a shoulder 8, and an end 9 of the swelled portion 2b positioned at opposite side of the basal portion 2a is closed. Screw thread 10 is formed on the inner surface of the swelled portion 2b, and is engaged with the screw thread of the end portion of the bolt extending from the nut. As a result of this, the screw thread 10 of the cover 1 of the nut becomes, when applied over the nut, a disengagement-proof means for preventing slipping after displacing in the direction of the axis of the bolt.

A nut 11 applied with a cover 1 of a nut according to the present invention is on the periphery equipped with a groove 13 shaped to be the deepest at the edges 12, and with this groove 13 extrusions 5 formed on said cover 1 of the nut are fitted. Thus, when the cover 1 is applied over the nut, this cover 1 makes a disengagement-proof means preventing slipping off after displacing in the direction of the axis of the bolt.

Figure 5:
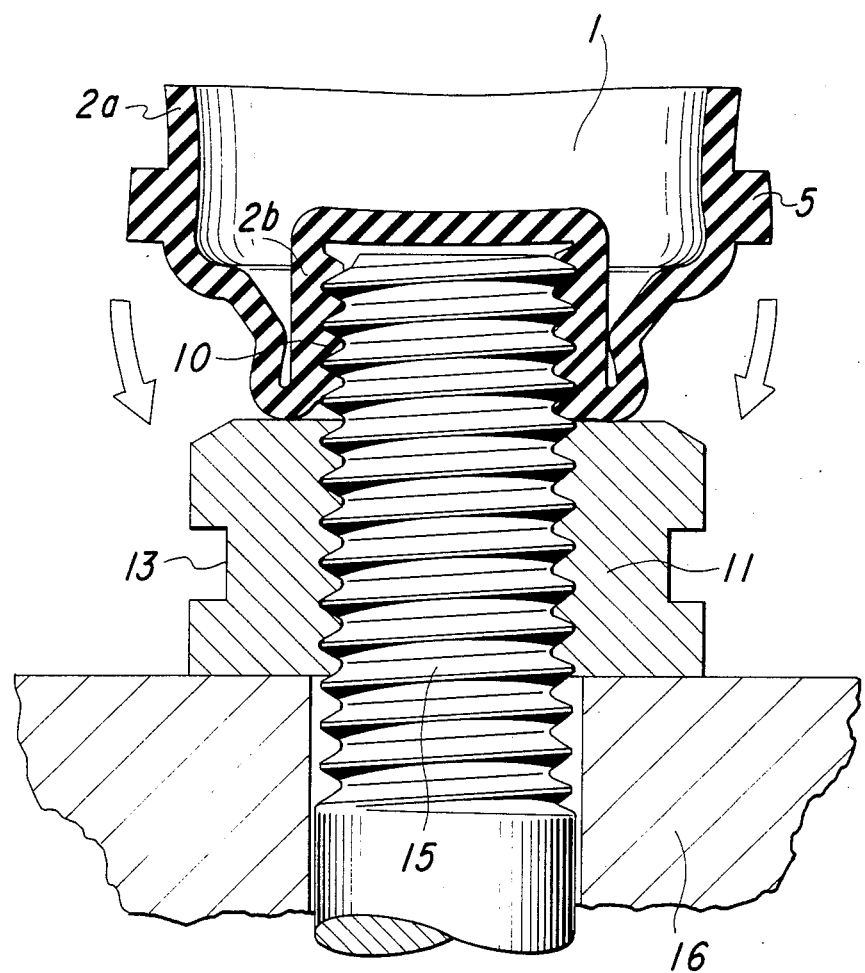
FIG. 5 is an explanatory drawing showing process for mounting a cover of a nut according to the present invention.

Said cover 1 of a nut can be formed according to, for example, a dipping mold process; that is, a mold, which has a shape of a bolt engaged with a nut and making an end of the bolt to be extruded out of the nut, is prepared and after a predetermined amount of sol of synthetic resin is attached around said mold it is formed by heat-setting. In this case, it is preferable that the mold has a shape to be decreased in the cross-sectional area of the nut as it approaches the end facing on the fastened piece, or to become smaller in the cross-sectional area of the general periphery than the periphery of the actual nut, because the basal portion to be fitted with the periphery of the nut fits tightly with the periphery of the nut by elastic force, when the cover is actually applied over the periphery of the nut. The cover 1 formed as above-mentioned is turned over folding the basal portion 2 outside (at this time the cover 1 is in a state as shown in FIG. 5 in relation to the mold). By rotating this portion turned over relative to the mold, the cover 1 is removed from the screw thread of the mold.

In order to connect the cover 1 formed as above-mentioned with the nut 11, at first the nut 11 is engaged with the bolt 15 for fastening the fastened piece 16. After that, provided an end of the bolt 15 is extruding out of one face of the nut 11, the basal portion 2a of the cover 1 is turned over as shown in FIG. 5, screw thread 11 formed on the swelled portion 2b of the cover 1 is engaged with screw thread of the bolt 15, edges 3 of the basal portion 2a is screwed in so as to take a position of facing the edges 12 of the nut 11, and the basal portion 2a is turned back for applying the cover 1 over the nut 11. In this case, if the number of edges 3 of the basal portion 2a is, for example, twice of the number of edges of the nut, chance of edges 3 of the cover 1 taking a position of facing on edges 12 of the nut 11 is increased to twice and flexibility increases in amount of screwing the cover 1. The position and dimension of each portion are more preferably determined so that the extrusions 5 of the basal portion 2a are fitted with the groove 13 of the nut 11 and the lower end of the cover 1 is pressed on the face of the fastened piece 16 when the cover 1 is turned back to the original position, since rain, corrosive gas, or the like is prevented from permeating into not only the connection between the nut 11 and the bolt 15 but also between the nut 11 and the fastened piece 16. However, it is not essential that the lower end of the cover 1 is pressed on the face of fastened piece 16.

Figure 6:
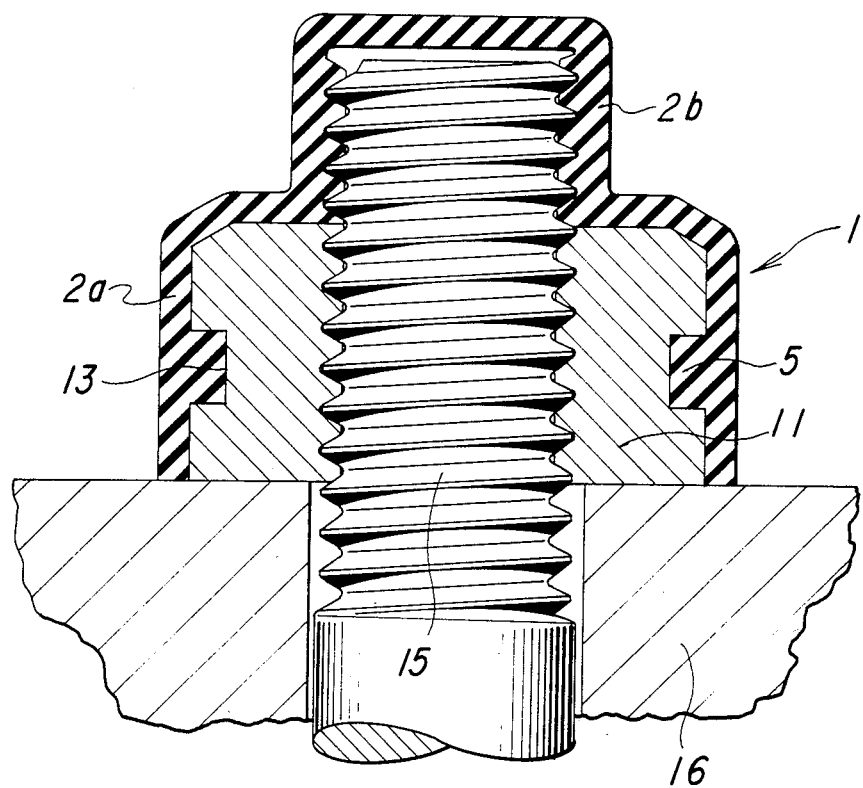
FIG. 6 is a cross-sectional drawing showing a state of finished mounting.

Thus, as shown in FIG. 6, cover 1 is connected with the nut 11 and permeating of rain or gas into the connection is prevented as well as possible. Alternatively, when an end of the bolt 15 is not extruded out of the end of the nut 11 and engagement of screw thread 10 is substantially impossible, the cover 1 is forced upon the nut 11 at a position of edges 3 of the cover 1 and edges 12 of the nut 11 facing each other. Then the extrusion 5 is fitted with the groove 13 and the cover 1 is connected with the nut 11.

Although, in above-mentioned examples, the grooves 13 of the nut 11 are formed on all of edges of the nut, it is not essential and the grooves of the nut 11 may be formed on at least one of the edges and extrusions 5 of the number corresponding to the grooves may be formed on the cover 1. And the depth of the grooves can be taken to reach the width across flats of the nut without decreasing in strength of the nut. The width of the groove can be taken less than one-third of height of the nut without hindering fastening the bolt.

The multi-angular cavity 4 of a safety cover and the nut 11 can be connected with tight fit using elasticity of the cover play-free in the cover and with better insulation of rain.

Whereas nuts illustrated above are of normal shape, the cover according to the present invention is applied to a lock nut of all metal as disclosed in the specification of U.S. Pat. No. 3,400,742 with effect of preventing corrosion of the ring of elastic thin plate.

Figure 7:
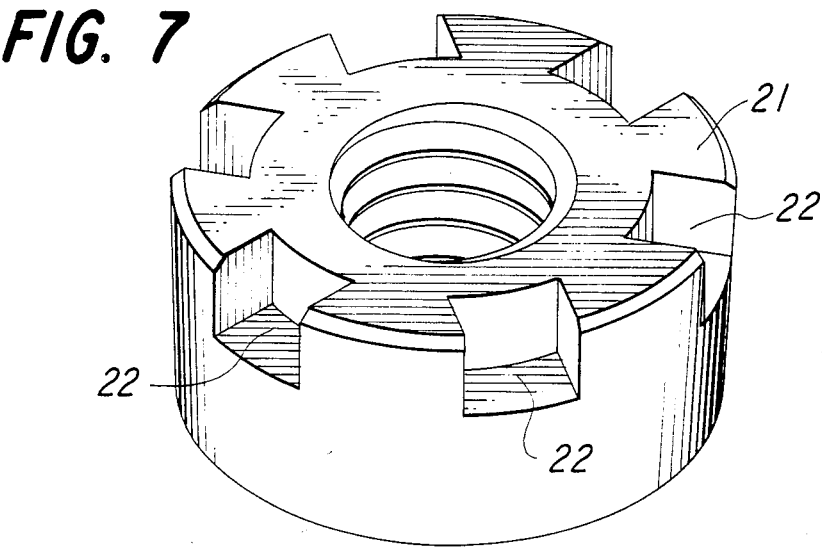
FIG. 7 is an angular perspective drawing of an alternative embodiment of a nut according to the present invention.
Figure 8:
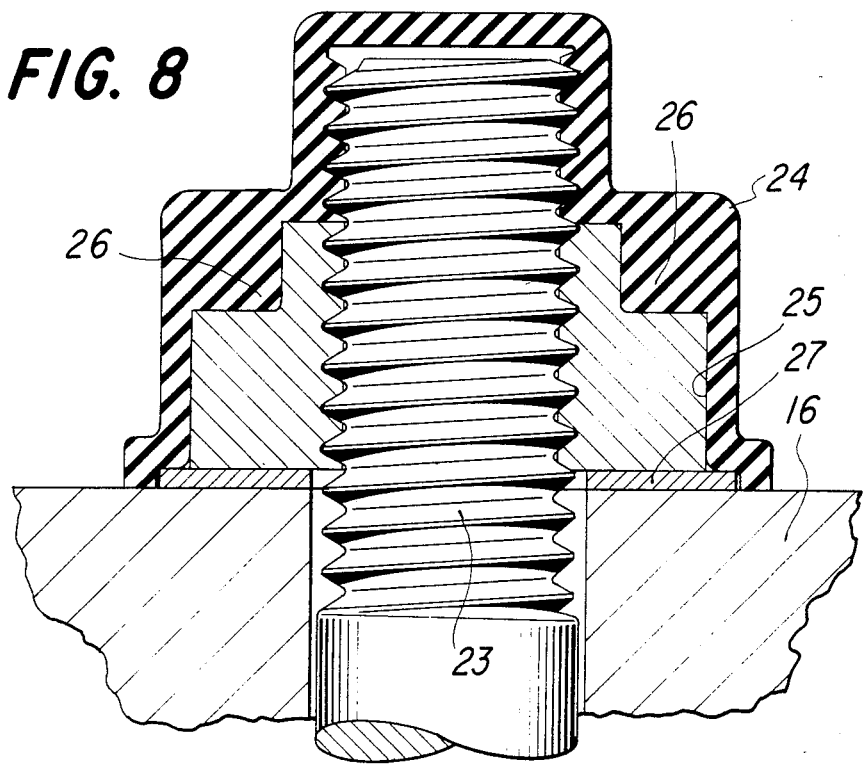
FIG. 8, is a cross-sectional drawing showing a state of mounting a cover over a nut shown in FIG. 7.

A peripheral shape of a nut 21 shown in FIG. 7 is circular, and a plurality of recesses are formed on the opposite face of the nut 21 to the side facing on the fastened piece. These recesses are operating means for convenience of turning the nut 21 fitted with extrusions of a tool (not shown in the drawing). The cavity 25 of the cover 24 has extrusions 26 to be engaged with said recesses so that they operate as turning-proof means of the cover 24, when the cover 24 is applied after being engaged with the bolt 23. In this case, it is not necessary for the number of the extrusions 26 to be the same as the number of the recesses 22, but in this embodiment a pair of extrusions are formed, being located face to face at a position of 180° apart. The number of extrusions 26 may be one at least. Further in this example the basal portion of the cover 24 is extending toward the fastened piece 16 as if it wraps the washer 27, too.

What is claimed is:

1. A cover for detachable fitting on a hexagon nut which is in engagement with a bolt to fasten a piece between the nut and bolt and has an outer periphery comprising vertical edges joined by planes, said cover comprising a resilient body comprising:
   a tubiform basal portion having upper and lower ends and receiving the periphery of said hexagon nut;
   a hollow swelled portion which extends integrally from the upper end of said basal portion and is closed at an end distal with respect to the basal portion, said basal portion and said hollow swelled portion being of substantially equal thickness and made from a material selected from the group consisting of polyvinyl chloride resin, polyethylene resin, polyurethane resin, fluoric resin and silicon rubber;
   an inner periphery of said tubiform basal portion having a configuration corresponding to that of the outer periphery of the hexagon nut, and being shaped to be smaller than the outer periphery of the hexagon nut so as to tightly fit on the edges and on the planes located between the edges of the outer periphery of the hexagon nut, an inner periphery of said hollow swelled portion having a screw thread to be engaged with a screw thread formed on an end of a bolt extending out of the nut;
   the hexagon nut being provided with recesses on the outer periphery at the middle position of the height of the nut, the recesses being formed at each of the edges of the nut;
   extrusions corresponding to said recesses extending inwardly and integrally from the inner periphery of the basal portion so as to fit with the recesses, having upper and lower wall surfaces, each of the extrusions having a height which is greatest at the edges and zero at the middle positions between the edges;
   the inner periphery of the wall of the basal portion being divided by said extrusions into an upper wall portion and a lower wall portion having substantially equal heights, the upper wall surface and bottom wall surface of the extrusions each extending along a line perpendicular to the axes of the bolt and nut, the bottom surfaces of said recesses being defined by a circle inscribed in said planes of the outer periphery of the hexagon nut so that the recesses have a depth which is greatest at the edges of the outer periphery of the nut and zero at the middle positions between two edges; the height of the lower wall portion of the basal portion being longer by a suitable value than the height of a lower portion of the nut defined by and between the bottom surface of the recesses and the bottom surface of the nut contacting with a piece fastened between the nut and a bolt engaged with the nut;
   both the bottom surfaces of the recesses and the bottom surface of the nut being perpendicular to the axes of the bolt and nut, so that an end surface of the basal portion is pressed elastically against a surface of a fastened piece through engagement of the screw thread of the hollow swelled portion with the screw thread of the end of the bolt and of the extrusions of the cover with the recesses of the nut, whereby the basal portion is capable of eaasily being turned over to cover the nut and easily turned back to be detached from the nut.

2. A cover according to claim 1, wherein the lower end of the basal portion is forced and held upon the fastened piece by the elasticity of the resilient body.

3. A cover according to claim 1, wherein the width of the recesses is less than one-third of height of the nut.

* * * * *